US009759433B2

(12) United States Patent
Hahn

(10) Patent No.: US 9,759,433 B2
(45) Date of Patent: Sep. 12, 2017

(54) HOT AND COLD TEMPERATURE SUPPLY DEVICE

(71) Applicant: Thomas Hahn, Schöneck (DE)

(72) Inventor: Thomas Hahn, Schöneck (DE)

(*) Notice: Subject to any disclaimer, the term of this patent is extended or adjusted under 35 U.S.C. 154(b) by 180 days.

(21) Appl. No.: 14/650,724

(22) PCT Filed: Dec. 16, 2013

(86) PCT No.: PCT/EP2013/076746
§ 371 (c)(1),
(2) Date: Jul. 19, 2015

(87) PCT Pub. No.: WO2014/091033
PCT Pub. Date: Jun. 19, 2014

(65) Prior Publication Data
US 2015/0345806 A1 Dec. 3, 2015

(30) Foreign Application Priority Data
Dec. 14, 2012 (DE) .................. 10 2012 112 347

(51) Int. Cl.
F28F 11/00 (2006.01)
F24F 1/02 (2011.01)
F24H 4/04 (2006.01)
F24H 7/04 (2006.01)
F24D 11/02 (2006.01)
F25B 27/00 (2006.01)
F25B 30/04 (2006.01)
F25B 30/06 (2006.01)
B60H 1/00 (2006.01)
F28D 20/00 (2006.01)
F25B 15/04 (2006.01)
F25B 25/00 (2006.01)

(52) U.S. Cl.
CPC ............ *F24F 1/02* (2013.01); *B60H 1/00492* (2013.01); *F24D 11/0221* (2013.01); *F24H 4/04* (2013.01); *F24H 7/04* (2013.01); *F25B 27/005* (2013.01); *F25B 30/04* (2013.01); *F25B 30/06* (2013.01); *F28D 20/0039* (2013.01); *F24D 2200/126* (2013.01); *F24D 2220/08* (2013.01); *F24D 2220/10* (2013.01); *F25B 15/04* (2013.01); *F25B 25/005* (2013.01); *F25B 2339/047* (2013.01); *F25B 2400/06* (2013.01); *F25B 2400/071* (2013.01); *F25B 2400/24* (2013.01); *Y02B 10/20* (2013.01); *Y02B 10/70* (2013.01); *Y02B 30/126* (2013.01); *Y02E 60/142* (2013.01)

(58) Field of Classification Search
CPC ........ F25B 27/005; F25B 30/04; F25B 30/06; F24H 4/04; F24H 7/04; F24D 11/0221; F24D 20/0039; F24F 1/02
USPC .......................................... 165/70
See application file for complete search history.

(56) References Cited

U.S. PATENT DOCUMENTS 4,072,183 A * 2/1978 Fraas .................. F22B 1/063
122/33
2004/0251007 A1* 12/2004 Toh ..................... F17C 1/00
165/157

FOREIGN PATENT DOCUMENTS

DE 2604942 A1 8/1977
DE 2741507 A1 3/1979
EP 0660055 A2 6/1995
WO 8100447 A1 2/1981
WO 2009049612 A2 4/2009

OTHER PUBLICATIONS

International Search Report (Apr. 3, 2014) for corresponding International App. PCT/EP2013/076746.

* cited by examiner

Primary Examiner — Davis Hwu
(74) Attorney, Agent, or Firm — WRB-IP LLP

(57) ABSTRACT

A device is provided for supplying heating and cooling, the device having a heat transfer medium arranged in the interior of a storage tank and having at least one cycle process plant operated using a working substance. The heat transfer medium has a lower temperature in a bottom region of the interior than in a region of the interior arranged thereabove. All the components of the cycle process plant that contain the working substance are arranged in the interior. The components of the cycle process plant arranged inside the storage tank are surrounded by the heat transfer medium. The heat transfer medium has constituents to bind or convert the working substance. The amount of the constituent as a proportion of the heat transfer medium is dimensioned in such a way that the working substance contained in the cycle process plant can be completely bound or converted by the constituent after an escape from the cycle process plant.

19 Claims, 6 Drawing Sheets

HOT AND COLD TEMPERATURE SUPPLY DEVICE

BACKGROUND AND SUMMARY

The invention relates to a device for supplying heating and cooling having a heat transfer medium arranged in the interior of a storage tank and having at least one cycle process plant operated using a working substance, whereby the heat transfer medium has a lower temperature in a bottom region of the interior than in a region of the interior arranged thereabove and whereby the components of the cycle process plant are arranged in the interior.

Definition of Terms for the Terms Cycle Process Plant, Working Substance and Heat Transfer Medium:

The term Cycle Process Plant in the present context denotes all refrigeration cycle processes and other thermal cycle processes, for example operated by means of a gas. Refrigeration cycle processes in the present context comprise all cycle processes operating in a counter-clockwise direction in which the compression takes place mechanically or thermally. These include refrigeration cycle processes with a working substance, e.g. heat pumps and refrigeration units together with thermally compressed absorption cycle processes or diffusion-absorption processes, and furthermore also adsorption cycle processes and heat pipes. Moreover, the term Cycle Process Plant in the present context also comprises cycle processes operating in a clockwise direction, e.g. the Stirling cycle process.

The term Working Substance in the present context comprises all fluids, e.g. the refrigerants and working gases that are used as a working medium in the Cycle Process Plant. Examples of these include the refrigerant in the refrigeration cycle process or the gas in a Stirling cycle process.

The term Heat Transfer Medium comprises all fluids and if necessary solids that can be used as the heat storage medium in a heat storage tank or in pipework leading to and from it and as a heat transport medium in a heat exchanger system with pipework.

Such heating and cooling supply devices are used to generate and provide useful cooling or useful heat. For example, the heating of the heat transfer medium by means of suitable external heat sources in the interior of the storage tank and storing the thermal energy of the heat transfer medium in the storage tank is already known. Conventional storage tanks often have thermal insulation for this purpose. Such storage tanks are also called stratified storage devices because the heat transfer medium has different temperatures in the storage tank, and arranges itself in layers of the same temperature arranged one above the other according to their temperature-dependent density. The temperature of the heat transfer medium increases continuously from bottom to top, whereby the temperature of the heat transfer medium is largely homogeneous in each of the horizontal layers.

Due to the temperature-dependent stratification of the heat transfer medium, heat energy at a different temperature can be input, into the heat transfer medium particularly efficiently, and heat energy at a different temperature can easily be withdrawn from the heat transfer medium. Therefore such a heating and cooling supply device can be used to generate and store usable heat or usable cooling within the stratified storage device.

For example, by using suitable heat exchangers, the heat transfer medium in an upper region of the storage tank can be heated to a sufficiently high temperature far it to be used as process water. For example, a low-temperature heating device can be supplied with thermal energy by means of the heat transfer medium at a lower temperature of the layers located below it. For example, it is also possible, by using the heating and cooling supply device and by using suitable heat exchangers, to generate and to remove useful cooling from the storage tank from layers at a tow temperature to operate an air-conditioning plant or a refrigeration device.

For example, the use of thermal solar collectors or geothermal heat sources to introduce thermal energy into the heat transfer medium in order to input heat energy into the stratified storage device or into the storage tank is already known. In general, heat sources of any kind can be incorporated into the heating and cooling supply device via suitable heat exchangers arranged inside the storage tank. In this way, it is easily possible to use the heating and cooling supply device to operate a variety of devices to generate and use thermal energy, whereby these devices can display different cycle processes.

The withdrawal of heat from the heat transfer medium in the lower region of the storage tank by cooling down and the input of this heat into the heat transfer medium in the upper region of the storage tank in order to enable the introduction of heat energy into the storage tank as efficiently as possible and to make the heat energy available inside the storage tank at the required temperatures is already known. In this way, the temperature of the heat transfer medium in the lower region of the storage tank is further reduced so that, for example, useful cooling can be abstracted more efficiently from the storage tank, or heat energy at a lower temperature can be input more efficiently into the stratified storage device. At the same time, heat energy at a higher temperature in the upper region of the storage tank is made available as a result of the redistribution.

Cycle process plant components, e.g. heat pumps, are arranged inside the storage tank to redistribute the thermal energy in the storage tank. For example, an evaporator and a condenser (liquefier) of a heat pump can be arranged inside the storage tank, and the heat pump can be used to redistribute the heat energy.

Fully halogenated fluorocarbons (FCs) or partly halogenated fluorocarbons (HFCs) are often used as working substances in conventional heat pumps. These hydrocarbons halogenated with fluorine (FCs and HFCs) have no ozone degradation potential (ODP) in the earth's atmosphere, like for example CFCs (chlorofluorocarbons). The climate is affected nonetheless. The FCs and HFCs contribute to the greenhouse effect according to the same principle as carbon dioxide ($CO_2$). Long wavelength radiation from the earth into space is partly reflected by FCs and HFCs in the upper layers of the atmosphere and remains within the earth's atmosphere.

FCs and HFCs have a long residence time in the atmosphere of between 2 and 250 years. The global warming potential (GWP) of individual fluorinated hydrocarbons is higher than that of carbon dioxide by a factor of 100-15,000. For example, the working substance R134a ($C_2H_2F_4$) used in almost all motor vehicle air-conditioning installations has a GWP value of 1,300.

Chlorofluorocarbons (CFCs) can be hydrocarbons halogenated with chlorine and bromine. Chlorofluorocarbons (CFCs) are known as Frigen or Freon. CFCs contribute directly to the degradation of the ozone layer. The destruction potential (ozone-depleting potential) towards the ozone layer at a height of 15 to 40 km is caused mainly by the chlorine. The reduction of the ozone layer causes higher irradiation with incoming UV-B. This radiation causes cell damage, with adverse effects on living organisms and plants. CFCs have been banned as working substances (refrigerants) in new devices since 2000. Despite the ban in relation to new devices, they continue to be used in a few countries.

To avoid the injurious environmental effects of these working substances, it is possible to use alternative working substances, e.g. natural working substances (refrigerants) such as ammonia, dimethyl ether, isobutene, propane, CO2 and mixtures such as ammonia-dimethyl ether etc. Moreover, such working substances have an efficiency advantage compared to the FCs and HFCs that are often used. However, the technical application of such working substances is not easy.

Ammonia, for example, due to its toxicity, cannot be used in devices operated in enclosed spaces. Small refrigerators operated using ammonia-water absorption processes are an exception. According to the Hazardous Substances Regulations, Annex II, NH3 (ammonia) is a hazardous gaseous substance.

Propane and butane are extremely flammable, and the use of CO2 in the trans-critical region causes high pressures in the refrigeration circuit. For example, toxic ammonia or flammable butane or propane can escape if there are leaks or damage to pipework or other components of cycle process plants or heat pumps. Cycle process plants with larger amounts of these working substances are currently not operated in enclosed or inhabited buildings. For example, CO2 is also toxic if it escapes into a cellar. Concentrations of more than 8% in the air breathed are fatal. The use of ammonia as a working substance, for example, requires the cycle process plants to be erected in a ventilated place or to be erected in the open air. Ammonia is often used as a working substance in larger refrigeration plants, most of which stand in the open air.

Together with water, ammonia forms a solution with an alkaline reaction. NH3+H2O→NH4++OH—. Ammonia causes a pungent odor that is already perceptible at very low concentrations (5 ppm) far below the maximum permitted workplace concentration of 10 ppm. Ammonia is in Safety Group B2, Fire Class C and Explosion Group II A.

It is desirable to provide a heating and cooling supply device in which redistribution of the heat energy within the storage tank is achieved when using a cycle process plant operated using a toxic, highly flammable or highly compressed working substance.

According to an aspect of the invention, a storage tank is adapted to the working substance in such a way that, if the components carrying the working substance are damaged, the working substance escaping from the cycle process plant remains securely contained within the storage tank.

For this purpose, provision can be made for the pressure strength of the storage tank to be adapted to the working substance used. It is also advantageous that all the components of the cycle process plant containing the working substance are arranged in the interior.

If a leak occurs on pipework or on another component of the cycle process plant arranged entirely inside the storage tank, the escaping working substance flows into the storage tank and is not released into the surroundings. In this way it is possible for even toxic and highly flammable working substances to be used to operate the cycle process plant that is arranged inside the storage tank and is employed to redistribute the heat energy inside the storage tank, whereby a hazard caused by escape of the working substance is effectively avoided even in the event of damage. Escaping working substance is contained in the storage tank.

According to an aspect of the invention, this also enables the use of ammonia as the working substance in the cycle process plant, even when used in buildings or residential buildings. Although ammonia is toxic, it is very efficient and does not damage the climate. Ammonia has a very large specific enthalpy of vaporization. Therefore, cycle process plants operated using ammonia can be operated at the same capacity with smaller amounts of the working substance. Ammonia is also environmentally neutral and has no carcinogenic activity.

In addition to the so-called "natural refrigerants", the newly developed fluorohydrocarbon-based working substances, e.g. HFO-1234yf, are also toxic and highly flammable. The intention is for this working substance to be used in passenger cars in the future.

The heating and cooling supply device according to an aspect of the invention also enables the safe operation of cycle process plants that use such newly-developed working substances.

According to an aspect of the invention, it is also possible for several cycle process plants, e.g. heat pumps, to be arranged for example one above the other within the storage tank. In this way, the individual heat pumps can be operated with smaller temperature rises, with the result that each individual heat pump can be operated at a higher efficiency.

By means of the heating and cooling supply device according to an aspect of the invention it is possible, through the redistribution of the heat energy within the storage tank, for example for air-conditioning plants, refrigeration plants and other devices of any kind to use or provide heat energy to be operated with comparatively small temperature rises and thus particularly efficiently, and the efficiency increases especially during part-load operation, an operating mode that predominates for long periods during the year. The design of refrigeration plants and heat pumps is governed by the possible temperature spectrum, whose extreme values are reached on only a few days in the year.

In order to assess the efficiency of cycle process plants or heat pumps, the so-called coefficient of performance or COP is determined. To a first approximation the relationship between the COP and the temperature rise can be characterized as "half the temperature rise corresponds to double the yield". This holds true for the usual temperature ranges for air-conditioning and heating.

A heat pump's COP is determined via the Carnot efficiency. This Carnot efficiency must be corrected with the heat pump's quality grading factor. On average, the grading factor, which states the actual losses in the heat pump's cycle process, is about 50% of the energy used. These losses are essentially mechanical and thermal losses together with flow losses and losses in the working substance.

$$\varepsilon_{wp} = 1/\eta_c - T_{hot}/(T_{hot} - T_{cold}) \times 0.5 \text{ (absolute values in Kelvin)}$$

The efficiency of any desired cycle process plant is determinable in an analogous way.

As a result of the arrangement of several cycle process plants (e.g. heat pumps) within the storage tank and the efficiency increase thus achieved due to the smaller required partial temperature rises and simultaneous prevention of heat losses, it is possible for useful thermal energy to be provided particularly efficiently with the aid of the heating and cooling supply device according to an aspect of the invention.

To cascade several cycle process plants or heat pumps in the case of conventional plants, a condenser of a first cycle process plant is coupled to a vaporizer of a second cycle process plant, e.g. using as countercurrent heat exchanger. This means that coupled cycle process plants must always be operated simultaneously. In practice, the design of such plants is very complex and error-prone. Therefore, plants coupled in this way are offered extremely rarely. For example, heat pump cascades are currently offered that consist not of a cascade as described here, but comprise two or more independent heat pumps used in parallel one after another. In this respect, these heat pumps always perform the same overall temperature rise. In this context, the term "cascade" is understood to mean an optional parallel connection. This shows that an actual cascade variant, which is the subject matter here, is not observed at all in practice.

The heating and cooling supply device according to an aspect of the invention enables different heat pumps or cycle process plants to be cascaded, whereby the overall temperature rise can be distributed over individual cycle process plants. For example, the temperature rise from −5° C. to +30° C. can take place in a first cycle process plant, and a temperature rise from ±25° C. to +50° C. can take place in a second cycle process plant arranged above the first cycle process plant.

According to an aspect of the invention, several cycle process plants arranged inside the storage tank can be operated simultaneously or individually.

When used to generate cooling, the heating and cooling supply device according to an aspect of the invention enables operation with toxic or hazardous working substances with the simultaneous use of free cooling within the temperature bandwidth of the heat transfer medium stored in the storage tank. At the same time, heat can easily be withdrawn from the storage tank as useful heat when necessary by using a heat exchanger. For example, such a solution can be used in an easy, cost-effective way for cooling foodstuffs and the simultaneous heating requirement, e.g. in supermarkets.

The design of the heating and cooling supply device according to an aspect of the invention, in which the heat pump components arranged in the interior are entirely surrounded by the heat transfer medium, necessarily yields the advantage that all heat losses, e.g. the waste heat from the refrigeration cycle compressor, arise inside the storage tank and are stored in the heat transfer medium a id are available for use. Consequently, the heat pump's power losses are reduced considerably.

To enable the heating and cooling supply device according to an aspect of the invention to operate as safely as possible, advantageous provision is made for the heat transfer medium to contain constituents to bind, convert or neutralize the working substance.

The steps according to an aspect of the invention will be explained by taking as an example the working substance ammonia. Much of the heat transfer medium consists of or comprises water, whereby the water absorbs the ammonia escaping from the cycle process plants in the event of damage. Moreover, another component of the heat transfer medium can consist of or comprise acetic acid, which reacts with the escaping ammonia to form non-hazardous ammonium acetate ($CH_3-COONH_4$).

In this way, in addition to providing heat energy at various different temperature levels, the heat transfer medium also performs the additional function of degrading or absorbing escaping working substance. According to an aspect of the invention, the heat transfer medium can also contain reactants, reducing agents, binding agents, chemical complexing agents or other functional substances. According to an aspect of the invention, it is also possible for the heat transfer medium to contain emulsions or mixtures of several of the components described above.

Such a multifunctional heat transfer medium is an essential constituent of the heating and cooling supply device according to an aspect of the invention. The multifunctional heat transfer medium enables the non-hazardous operation of cycle process plants, e.g. heat pumps, even when using hazardous or toxic working substances.

The volume-specific heat storage capacity is increased simultaneously by using additional latent storage materials, so-called phase-change materials, as the heat transfer medium.

The coupling and regulation of two or more cycle process plants or heat pumps is easier and more efficient due to the opportunity to increase the heat capacity in predetermined temperature ranges within the storage tank by the use of suitable latent storage material, e.g. paraffin. For example, the coupled cycle process plants can be operated for longer in the regions of each of their respective optimum characteristic diagrams. Additional targeted storage capacity is made available for this purpose in a targeted manner in the evaporator or condenser temperature range due to the phase change.

According to an aspect of the invention, several cycle process plants can be operated by means of toxic, flammable or otherwise hazardous working substances.

Particularly safe operation of the heating and cooling supply device according to an aspect of the invention is advantageously enabled in that the amount of the constituents as a proportion of the heat transfer medium is dimensioned in such a way that the working substance contained in the cycle process plant can be completely bound or converted by the constituents. For this purpose, the constituents added to the heat transfer medium to bind or convert the working substances used in the cycle process plant must be matched to these working substances. In this respect, the respective quantitative relationships of the constituents must be dimensioned such that the working substance escaping from the cycle process plant components in the event of damage can be bound and converted inside the storage tank.

For safety reasons, this binding, absorption or conversion function of the heating and cooling supply device according to an aspect of the invention must be achievable inside the storage tank under all possible operating states of the heating and cooling supply device, including various different temperature and pressure conditions.

For example, to reduce a pressure-increasing effect of gases escaping in the event of damage, there is provision according to an aspect of the invention for the storage tank to be required to be filled with the heat transfer medium to a predetermined extent at all times. Sensors or level sensors must be provided for this purpose.

The storage tank must also be designed in such a way that the reaction heat formed by exothermic chemical reactions during an incident of damage can be absorbed. Ammonia is mentioned again here as an example. The enthalpy of solution of ammonia at 25 degrees Celsius is −30.64 kJ/mole. For example, 30 kJ of heat energy is released during the absorption of 17 grams of ammonia in water. For 3000 grams of ammonia, this amounts to 5294 kJ, equivalent to approx. 1.5 kWh.

The existing regulations according to DIN EN 378-1 Table E1 describe extensive regulations and safety precautions for cycle processes operated using ammonia and with an ammonia filling quantity of more than 3000 grams. The so-called basic obligations of the Major Accident Ordinance already apply at a filling quantity of 2000 grams. For a filling quantity of more than 3000 grams of ammonia, stringent regulations apply to the installation location, ventilation, emergency ventilation, the pipework, the escape routes, the fire resistance and the pressure relief. Moreover, monitoring and safety appliances, maintenance regulations and emergency equipment are prescribed.

The design of the heating and cooling, supply device according to an aspect of the invention includes the dimensioning of the components in certain size relationships. These affect mainly the dimensioning of the cycle processes, the site of the storage tank and the volume and constituents of the multifunctional heat transfer medium.

In the example considered here, using ammonia as the working substance, it is necessary to achieve a situation in which, under all operating conditions, ammonia escaping from the cycle processes in the event of damage is completely absorbed or converted inside the storage tank.

Preferably, the storage tank can be of "non-pressurized" construction. Heat exchange then takes place entirely via heat exchangers, without the heat transfer medium leaving the storage tank. A residual volume in the storage tank is also provided for thermal expansion.

To bind ammonia by absorption in special machine rooms, there are regulations permitting a maximum quantitative ratio of ammonia to water of 0.12 (BGV [Occupational Health and Safety Regulations of the Trade Associations] D4 Section 17.1). In this connection, the water is stored alongside the refrigeration machines in an open container which performs the function of a safety device.

For example, according to this Regulation, in a storage tank according to an aspect of the invention with a 500 liter proportion of water in the heat storage medium, a maximum of approx. 60 kg of ammonia could be absorbed safely in this quantity of water.

As a rule, however, due to the other functional requirements, a device according an aspect of to the invention provides a considerably better ratio of water to working substance. For example, a maximum of 3 kg of ammonia within a 500 kg proportion of water in the heat storage medium.

The solubility of ammonia in water decreases to an astonishingly large extent with increasing temperature. At a pressure of one bar and a temperature of 20 degrees Celsius, 500 grams of ammonia can be dissolved in 1000 grams of water, corresponding to about 700 liters of ammonia gas in 1 liter of water. At a temperature of 70 degrees Celsius and the same pressure, the remaining solubility is only 200 grams of ammonia in 1000 grams of water. At 100 degrees Celsius, the remaining solubility is only 75 grams of ammonia in 1000 grams of water.

According to an aspect of the invention, there is provision for the heat of reaction arising in the proportion of water in the event of damage also to be absorbed and stored by latent storage material (PCM, phase-change material) as a constituent of the heat transfer medium.

As described above, the latent storage material serves to increase the storage capacity and simultaneously to optimize the cycle process plants. For example paraffin, is a suitable PCM material in this temperature range. Moreover, paraffin is chemically almost inert and therefore non-critical with regard to the contact with the working substances that is possible in the event of damage.

Advantageously, the invention also provides for the employment of heat storage capacity by using additional PCM materials that carry out a phase change at a higher temperature level. These additional materials are a passive constituent of the heat transfer medium until a temperature increase due to heat of absorption or other exothermic reactions with the working substances occurs after an incident of damage. Only then does a phase change and the heat energy storage occur. Suitable materials include for example storage salts or salt hydrates or other materials with melting points of around 80 to 100 degrees Celsius. These additional constituents of the heat transfer medium represent a safety system to absorb heat arising from exothermic reactions of the substances involved.

Advantageously, the invention provides for the working substance to be ammonia or carbon dioxide or a pure hydrocarbon. As a pure hydrocarbon, propane, butane or propylene for example can be used as the working substance. Particularly efficient operation of the cycle process plant inside the storage tank is possible in this way.

Advantageously, the invention provides for the heat transfer medium to consist of or comprise various different components. For example, in this way, several heat pumps can be arranged within the storage tank, whereby the individual heat pumps are also operated using different toxic or highly flammable working substances and whereby the components added to the heat transfer medium are adapted to bind or convert the various working substances.

Advantageously, the invention provides that the heat transfer medium can be present in a liquid or solid phase.

An especially advantageous embodiment of the heating, and cooling supply device according to an aspect of the invention has provision for the heat transfer medium to be a mixture of water, glycol and paraffin. Advantageously, the reagent can be acetic acid. For certain intended uses of the heating and cooling supply device, it can also be beneficial to additionally add surfactants or other additives to the heat transfer medium to stabilize an emulsion of various components.

The following further advantages can be achieved by means of the heating and cooling supply device according to an aspect of the invention:

A low temperature rise of the heat pumps and/or cycle process plants arranged inside the tank
  Heat pump evaporators and condensers with large dimensions and favorable flow patterns
  Short heat pump pipework lengths due to compact construction
  Smaller amounts of lubricant in the working substance
  Small losses of heat and cold
  The heat losses arising from cycle processes are accumulated inside the storage tank
  Easy coupling of two or more heat pumps or cycle process plants
  Coupling of different heat pumps or cycle process plants that are usable independently of one another
  Use of economically priced compressors for the heat pumps that are employed
  Parallel use of free cooling for refrigeration plains
  Parallel use of various heat sources for heat pumps
  Avoidance of ice formation on the heat pump's evaporator
  Simple use of latent storage media
  Use of latent storage media as a control element of the cycle processes
  Effective noise insulation.

For example, the lubricant saving results from the compact construction and very short pipework lengths that are possible within the cycle processes. The smaller proportion of lubricant added to the working substance increases the working substance's efficiency. The flow losses and losses in compression by the compressors are also reduced at the same time.

For example, large-sized evaporators and condensers of the cycle processes arranged inside the storage tank also increase efficiency by improving heat transfers.

According to an aspect of the invention, the multifunctional heat transfer medium to which constituents are added to convert, bind or neutralize the working substance(s) used fulfills the following functions:

1. Function as a heat transfer between all the heat exchangers located in the storage tank This enables useful heat and useful cold to be input into and withdrawn from storage in the storage tank. A horizontal temperature stratification is achieved within the heat transfer medium during the operation of the heat pump or cycle process plant. This enables the input into and withdrawal from storage of heat and cold at different temperatures in and out of the storage tank.

2. Function as a coupling medium between two or more cycle process plants inside the storage tank For example, the heat transfer medium carries out the transfer of heat from a condenser of a first heat pump to an evaporator of a second heat pump and thereby their coupling. In contrast to known processes to couple together heat pumps or cycle process plants, the individual heat pumps can be operated independently of one another in this way, because a vertical temperature gradient arises due to the temperature-dependent density differences of the heat transfer medium, and the heat rises upwards.

3. Function as an accumulator of any heat losses from the cycle process plants arranged inside the storage tank Thermal losses from the heat pumps or cycle process plants arise inside the advantageously thermally insulated storage tank and remain usable within the storage tank. The use is made possible through temperature-dependent density differences and a rising temperature gradient resulting therefrom.

4. Function as a latent heat storage device through the use of phase-change material (PCM) as a constituent of the heat transfer medium.

A higher energy density is achieved thereby. The energy-intensive phase change in temperature ranges that are meaningful for the use of the system is achievable through the targeted design or choice of substances. As described above, it is thereby possible to aim at particularly efficient areas of the characteristic diagrams of the respective cycle processes.

At the same time, the system's design can be aligned in such a way that, depending on the temperatures required for heat or usable cold, a higher energy storage density inside the storage system is made available in precisely these temperature regions.

An energy density of up to 120 kWh/m3 per cubic meter is achieved with paraffin. Other PCM materials such as salt hydrates or sorption storage systems are also usable in compliance with the other configurations of the heating and cooling supply device. Paraffin is chemically slow-reacting or inert, and is therefore also usable as a component of the heat transfer medium without danger in all operating states.

5. Function as frost-proofing

For example, the heat transfer medium can perform frost-proofing functions in applications below freezing point, e.g. for deep-freezing foods or when sub-cooling external heat exchangers for heat pumps. For example, this function is achieved by an addition of glycol into the heat transfer medium.

6. Function as a safety medium for hazardous working substances used in cycle process plants When using ammonia as the working substance, for example, this can escape in the event of damage to working substance pipework, evaporators, condensers, restrictors or compressors, or other components of the cycle process plants arranged inside the storage tank and containing the working substance. The heat transfer medium acts as a safety medium in the event of such damage. Escaping ammonia is absorbed immediately by its water constituent and thus rendered harmless. The heat of reaction arising during the chemical reaction of the working substance with the constituents must be taken into account when designing the heating and cooling supply device according to an aspect of the invention. The quantitative ratio of the ammonia and water used must also be designed for the most complete possible absorption of the amount of ammonia used in the proportion of water in the heat transfer medium. The worst-case temperatures and aggregation states of both the ammonia and the proportion of water in the heat transfer medium for absorption must be taken into account at the same time.

The molar ratios corresponding to the stoichiometric valency and arising from the reaction equations of the substances involved must be matched to one another when designing the respective plant. The substances participating in the reaction arise from the pairing of the working substances with the reactants that are a constituent of the heat transfer medium.

For example, it in the event of damage, ammonia escapes from components of a cycle process carrying working substance, the heat transfer medium with the ammonia absorbed therein can simply be carried away, treated further or subjected to additional conversion.

An aqueous solution of ammonia is a hazardous substance, but has further uses and can be transported. For example, a 25% solution of ammonia in water together with a catalyst is used as a reducing agent for nitrogen oxides in refuse incineration. A concentrated solution has a corrosive effect. Weaker solutions of ammonia in water of about 10% are familiar as tincture of ammonia. A 25% aqueous ammonia solution is a standard commercial product.

The heat of reaction occurring must be taken into account in the system design at the same time. The molar ratio of the ammonia and water used must also be designed for the most complete possible absorption of the quantity of ammonia used in the proportion of water in the heat transfer medium. The worst-case temperatures and aggregation states of both the ammonia and the proportion of water in the heat transfer medium for absorption must be taken into consideration at the same time. In this embodiment example using ammonia as the working substance and the storage system dimensions necessary for useful refrigeration or heat generation, the ratio of water to ammonia is sufficient to guarantee the adequate absorption of ammonia in the water in all operating states. Ammonia is extremely soluble in water. For example, 1 liter of water absorbs approximately 1,100 liters of gaseous ammonia at 0° degrees Celsius and a pressure of 1 bar. One liter of water absorbs 702 liters of ammonia at 20° C., releasing a heat of solution of 37.1 kJ/mole in the process. Ammonia together with water forms a weak base: $NH_3 + H_2O \rightarrow NH_4^+ + OH^-$. Thus the ammonia escaping from a cycle process plant in the event of damage is bound and no longer life-threatening. A massive escape of working substance simultaneously terminates the operation of the affected cycle process plant. To remedy the damage, the base can be transported away or treated further or converted.

7. Function as a neutralizing agent and reactant

According to an aspect of the invention, this function, like the absorption of ammonia already described, does not arise until working substance escapes due to an incident causing damage to the components carrying the working substance.

Due to the immediate reaction of the heat transfer medium inside the storage tank, toxic working substance does not escape into the environment. Moreover, it is chemically bound or converted, which excludes any health hazard. In the example used here, the transport or repair of a heating and cooling supply device according to an aspect of the invention is simplified by the conversion of an ammonia-water solution into ammonium acetate by the acetic acid.

This conversion is a highly exothermic reaction.

The reaction proceeds according to the following equation:

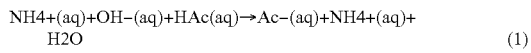

$$NH4+(aq)+OH-(aq)+HAc(aq) \rightarrow Ac-(aq)+NH4+(aq)+H2O \qquad (1)$$

In this example, in addition to the molar ratio of ammonia and water, the molar ratio of acetic acid to ammonia must also be taken in to account. Roughly an amount of acetic acid equal to about one fifth of the quantity of ammonia in the refrigeration circuits is needed as a constituent of the heat transfer medium. The quantitative proportion of acetic acid . . . .

8. Function as a pure storage medium

Without the active operation of the cycle process plant inside the storage device, the storage system according to an aspect of the invention functions for example as a solar storage device with solar collectors connected to it.

In another application to generate useful cooling, the storage system according to an aspect of the invention can be used at temperatures at the external heat exchanger below the cooling temperature as a free cooling system without operating the cycle process plant. For example, as a cold water set in winter.

Other Aspects of the Invention:

The heating and cooling supply device disclosed here extends beyond the arrangement and operation of cycle process plants inside a storage tank. The temporary or permanent operation according to an aspect of the invention of one or more cycle process plants inside a storage tank requires additional adaptations.

Cycle process plants according to the current state of the art that are installed inside storage tank in this unusual way cannot function effectively without a whole series of modifications and additional control parameters. For example, in contrast to plants according to the prior art, there is the problem of overheating in passive operation as a heat store. In this operating case, the storage device acts as a heat store without operation of the built-in cycle process plant. A temperature rise inside the storage device necessarily also causes temperature and pressure increases in the components of the shut-down cycle process plant that carry working substance. Depending on the working substance used, pressure increases can cause damage to materials. For example, a pressure increase of several 100% in the components carrying working substance is possible as a result of a passive temperature rise from 45° C. to 95° C. According to an aspect of the invention, safety devices and control parameters that limit the temperature in the storage device are necessary. According to an aspect of the invention, additional precautions must be taken over and above the control of refrigeration plants according to the prior art.

Due to the very compact construction, the dimensioning of the individual cycle process plants must be modified compared to the state of the art. For example, the oil circulation is significantly shorter, and so a smaller proportion of oil in the working substance is sufficient. The required compressor power can be reduced due to the resulting reduced flow losses.

The construction of a heating and cooling supply device that is the subject here requires coordination in many respects in its design and dimensioning. According to an aspect of the invention, the following parameters and components must be coordinated with the intended use and possible operating states:

1. Limitation of the storage device temperature even in passive operation, i.e. without using the cycle process plants. The maximum temperature depends on the permissible operating pressures of the working substance in the components.

2. Coordinating all the working substances used with the reactants and binding agents used in the heat transfer medium at the same time. If two or more cycle process plants are used, these must be coordinated in such a way that even the simultaneous escape of different working substances in the event of damage can be managed chemically in a controlled way.

3. The coordination of two or more cycle process plants in the storage device takes place with the smallest possible temperature rise in the individual cycle process plants. E.g. by a stepwise temperature rise distributed across the cycle process plants involved, and the corresponding arrangement of heat exchangers to bring external heat into or out of storage in the storage device.

4. The combination of different kinds of cycle process plants requires special design effort. For example, the combination of an electrically driven cycle process plant using ammonia as the working substance and a diffusion-absorption heat pump using an ammonia/water "refrigeration cycle". Individual cycle process plants can be brought into operation selectively for different temperatures to be supplied by the system. Advantageously, the characteristic diagrams of the individual refrigeration cycle processes are saved in a controller device according to an aspect of the invention for this purpose. Such an option enables the most favorable cycle process plant operating conditions to be used in each case. The choice of operation and of the duration of operation of the respective cycle process plant takes place depending on the required useful cooling or quantities of heat and their temperature. The temperature of the external heat exchangers and their heat capacity is taken into account at the same time. The control of the respective device takes place according to the principle that the direct use of external heat or "cooling" from the external heat exchangers must take place before the cycle process plants are used. Thereafter, the cycle process plants are used stepwise or in a time-cycled manner to achieve the temperatures and amounts of heat required by the system.

The controller regulates the combination of devices according to the principles of best possible efficiency and the degree of capacity utilization of all the connected units. The controller determines the maximum achievable efficiency depending on the external heat exchangers used for power intake and power output.

BRIEF DESCRIPTION OF THE DRAWINGS

Further advantageous embodiments of the heating and cooling supply device according to an aspect of the invention will be explained in detail based on the embodiment examples illustrated in the Drawing.

The Drawing shows.

DETAILED DESCRIPTION

Figure 1:
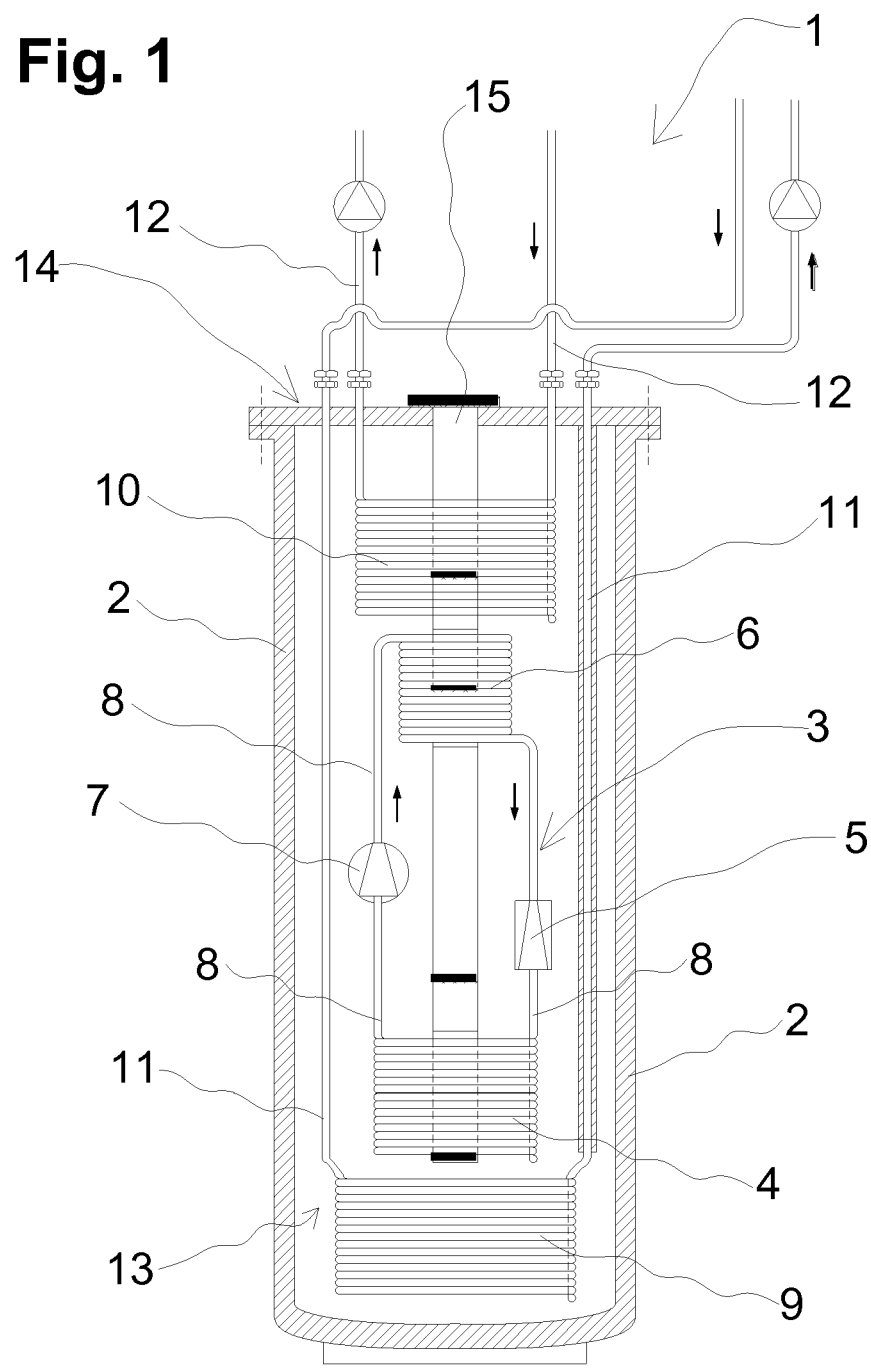
FIG. 1: A diagrammatic representation of a heating and cooling supply device with a heat pump arranged inside a storage tank.

FIG. 1 shows a diagrammatic representation of a heating and cooling supply device 1 with a cycle process 3 arranged inside a storage tank 2. The cycle process 3 has an evaporator 4, a restrictor 5, a condenser 6 and a compressor 7, these components being interconnected via pipes 8.

Inside the storage tank 2, there are also provided a first heat exchanger 9 arranged in a lower region of the storage tank 2 and a second heat exchanger 10 arranged in an upper region of the storage tank. The first heat exchanger 9 is connected via pipes 11 to a thermal heat exchanger, not shown, e.g. a solar installation. The second heat exchanger 10 is connected via pipes 12 to a heat exchanger, e.g. a heating installation.

Useful heat from the thermal solar installation is fed via the first heat exchanger 9 into a heat transfer medium 13 arranged in the storage tank 2. A temperature level of the heat transfer medium 13 is raised by means of the heat pump 3 to such an extent that heat to operate the heating installation can be abstracted via the second heat exchanger 10.

The heat pump 3 is operated using ammonia as the working substance. The heat transfer medium 13 contains a mixture of water, glycol, paraffin and acetic acid. The storage tank 2 is thermally insulated.

The pipes 11 and 12 are carried out of the storage tank 2 at an upper side 14 of the storage tank 2.

These pipes are constructed with a screwed connection so as to be separable. This simplifies installation of the heating and cooling supply device 1, since the storage tank 2 can easily be filled with the heat transfer medium 13 after being set up.

The second heat exchanger 10, the condenser 6 and the evaporator 4 are fastened to a mounting holder 15 attached to the storage tank 2.

Figure 2A:
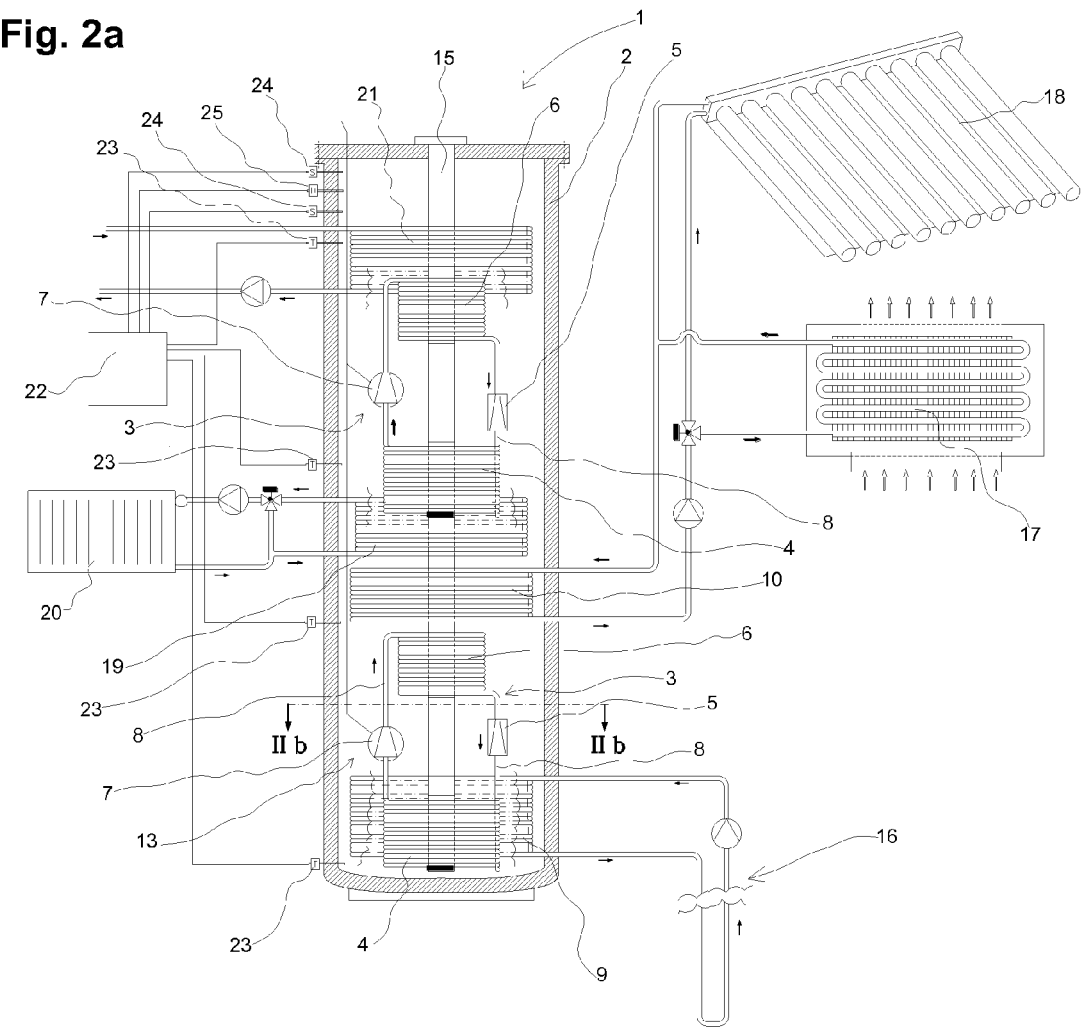
FIG. 2a: A diagrammatic representation of a heating and cooling supply device with two heat pumps arranged inside a storage tank and several heat exchangers arranged inside the storage tank.

FIG. 2a shows a diagrammatic representation of a heating and cooling supply device 1 with two heat pumps 3 arranged inside a storage tank 2. The storage tank is designed in a non-pressurized manner. There is a designated volume provided in the upper region of the tank for possible expansion of the heat transfer medium.

A first heat exchanger 9 is arranged in a lower region of the storage tank 2. The heat exchanger 9 is hydraulically connected to a geothermal heat source 16.

A second heat exchanger 10 is arranged in a central region of the storage tank 2 and hydraulically connected to an external heat exchanger 17 and a thermal solar installation 18.

A third heat exchanger 19 is arranged above the second heat exchanger 10, whereby the third heat exchanger 19 is hydraulically connected to a heating installation 20 and supplies heat to the heating installation 20.

In an upper region of the storage tank 2 there is provided a fourth heat exchanger 21 which is hydraulically connected to a hot water consumer, not shown.

To control and regulate the heat pumps 3 and the entire heating and cooling supply device 1, there is provided a controller device 22 that processes information from several temperature sensors 23, level sensors 24 and a pressure sensor 25 arranged inside the storage tank 2, and actuates all the controllable and regulatable components of the heating and cooling supply device 1 according to a pre-defined algorithm.

Figure 2B:
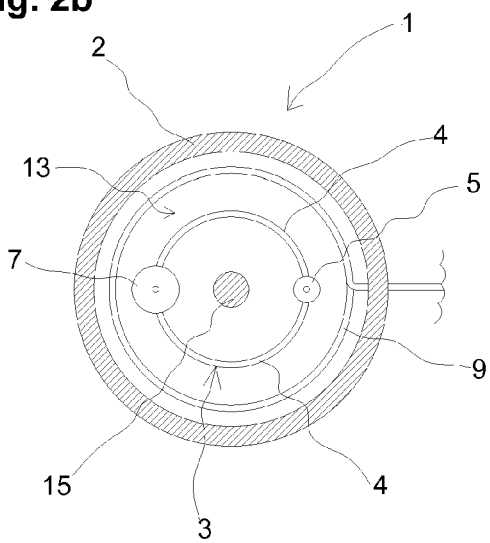
FIG. 2b: A diagrammatic representation of a cross-sectional view along the line IIb-IIb of the heating and cooling supply device illustrated in FIG. 2a, FIG. 3: A diagrammatic representation of a heating and cooling supply device with an absorption refrigeration machine arranged inside the storage tank.

FIG. 2b shows a diagrammatic representation of a cross-sectional view along the line IIb-IIb of the heating and cooling supply device 1 illustrated in FIG. 2a. The storage tank 2 of the heating and cooling supply device 1 has a circular cross-section. The heat pump 3 and the first heat exchanger 9 also have a circular design and are arranged coaxially relative to one another inside the storage tank 2, whereby the first heat exchanger 9 surrounds the evaporator 4 of the heat pump 3.

Figure 3:
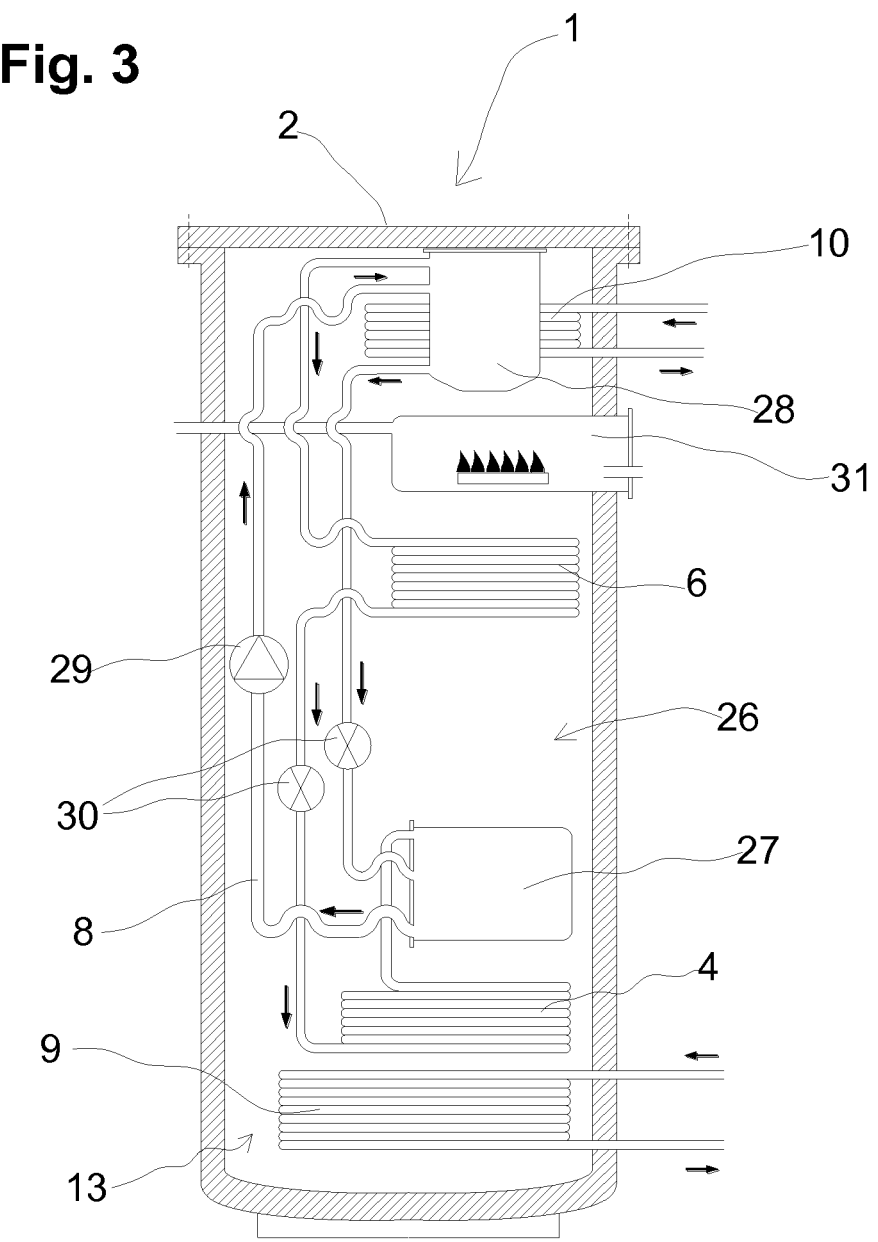

A diagrammatic representation of a heating and cooling supply device 1 is illustrated in FIG. 3. An absorption refrigeration machine 26 is arranged inside the storage tank 2. The diagram corresponds to an ammonia-water absorption refrigeration cycle process.

The absorption refrigeration machine 26 has a condenser 6, an evaporator 4, an absorber 27, a stripper 28, a solvent pump 29 and, in each circuit, a restrictor 30. These components of the absorption refrigeration machine are interconnected, via pipes 8. One pipe in the illustration is identified by a reference symbol as an example.

There is also a gas heater 31 inside the storage tank 2 to provide and transfer heat energy to the heat transfer medium 13. The heat transfer medium 13 has absorption and reaction agents adapted to the working substance used in the absorption refrigeration machine 26 to bind or convert toxic or fire-hazard working substance escaping from the absorption refrigeration machine 26 in the event of damage.

Ammonia is evaporated, e.g. by gas heating, in the stripper 28 (boiler). The stripped-out ammonia is condensed in a condenser 6 and the liberated heat is available in the heat transfer medium 13 surrounding the condenser 6. Ammonia is evaporated at reduced pressure in an evaporator 4. The heat needed for this is abstracted from the heat transfer medium 13 in the region of the evaporator 4. The water arriving from the stripper 28 re-absorbs the ammonia vapors originating from the evaporator 4 in an absorber 27. The heat of absorption and condensation liberated in this process is also released to the heat transfer medium 13.

Figure 4A:
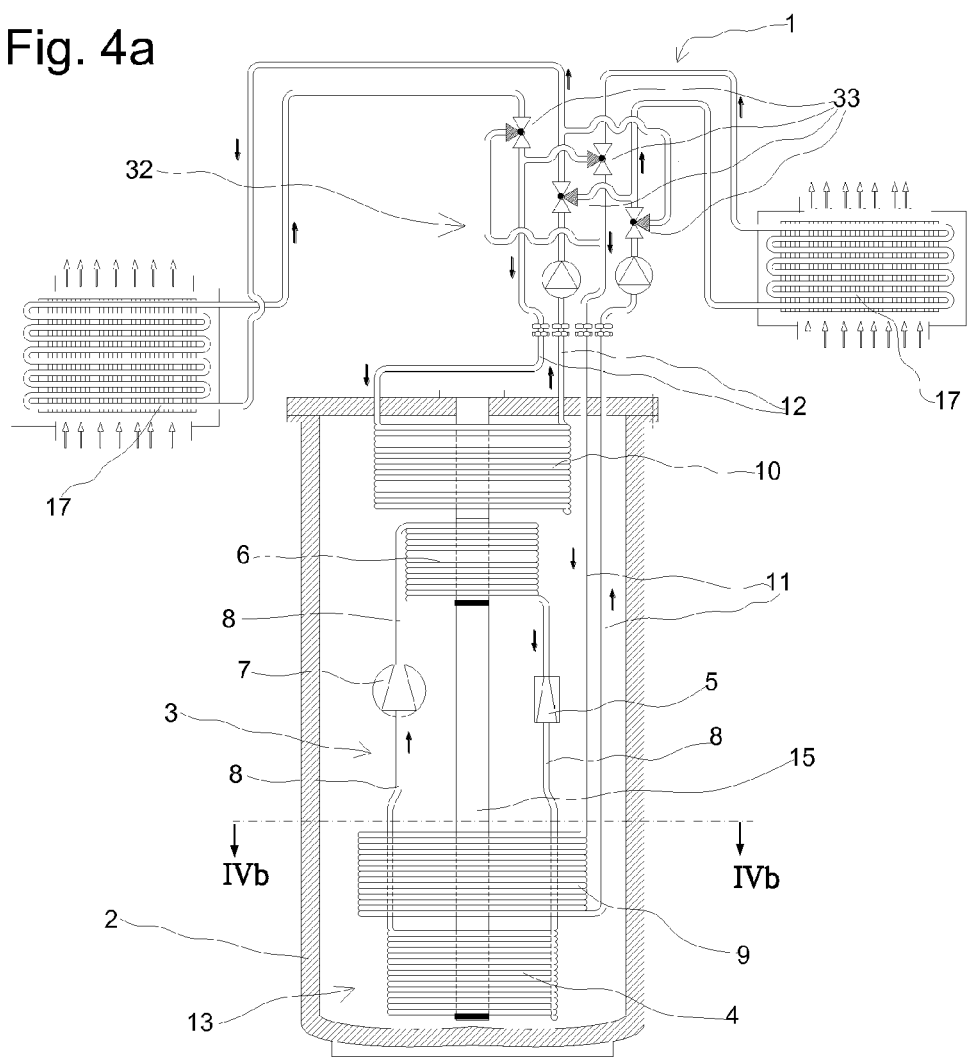
FIG. 4a: A diagrammatic representation of a heating and cooling supply device with a changeover switch device.

FIG. 4a shows a diagrammatic representation of a heating and cooling supply device 1. A first heat exchanger 9 and a second heat exchanger 10 arranged inside the storage tank 2 are connected hydraulically via a changeover switch device 32 to external heat exchangers 17. The changeover switch device 32 has four controllable valves 33. By using the valves 33, hydraulic connections between the first heat exchanger 9 and second heat exchanger 10 and the external heat exchangers 17 can be adjusted in such a way that the external heat exchangers 17 can be used either to cool or to heat.

Figure 4B:
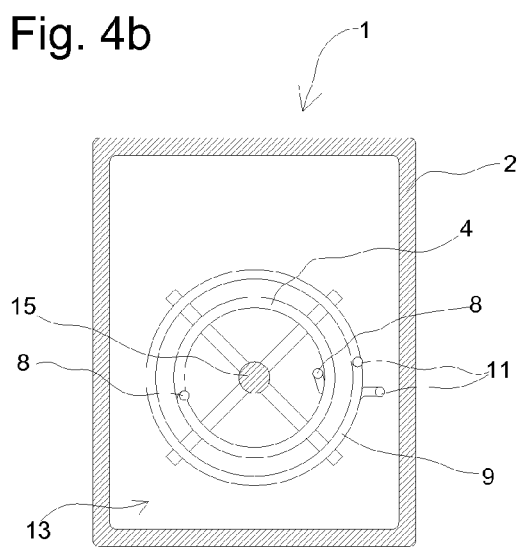
FIG. 4b: A diagrammatic representation of a cross-sectional view along the line IVb-IVb of the heating and cooling supply device illustrated in FIG. 4a, FIG. 5: A diagrammatic representation of a heating and cooling supply device for use as a vehicle cooling plant.

FIG. 4b shows a diagrammatic representation of a cross-sectional view along the line IVb-IVb of the heating and cooling supply device 1 illustrated, in FIG. 4a. The storage tank 2 has a rectangular cross-section. The first heat exchanger 9 and the evaporator 4 have a circular design and are fastened to the mounting holder 15 in a coaxial arrangement relative to one another.

Figure 5:
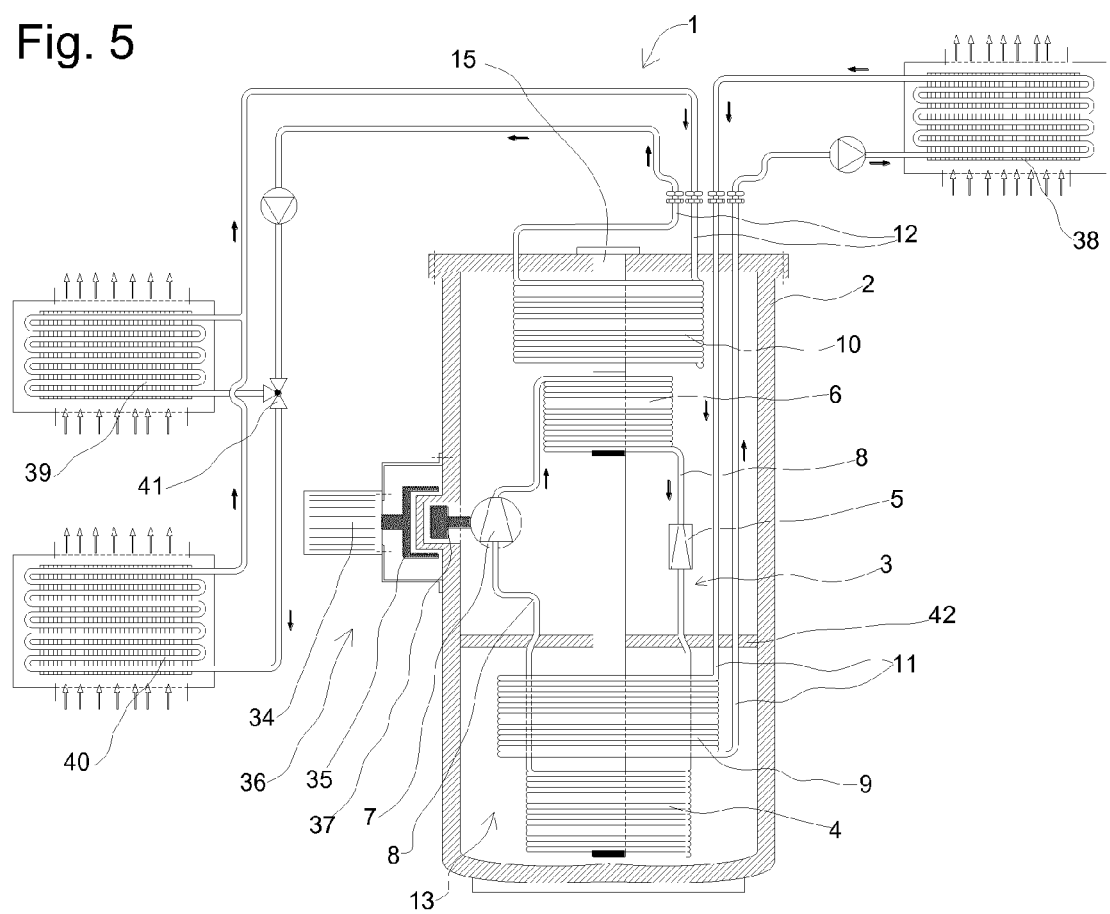

FIG. 5 shows diagrammatically a heating and cooling supply device 1 for mobile use, e.g. for a vehicle. Arranged on the storage tank 2 there is an electric motor 34 connected to a first magnetic clutch component 35 of a magnetic clutch 36. A second magnetic clutch component 37 of the magnetic clutch 36 is arranged on the compressor 7 of the heat pump 3 arranged inside storage tank 2. The heat pump 3 can be driven by means of the magnetic clutch 36, whereby the electric motor to drive the compressor 7, which is located inside the storage tank, is arranged outside the storage tank 2. As an alternative to an electric motor, the drive can also be undertaken by the vehicle's engine via a belt pulley, a chain or the like. This arrangement enables the drive without a shaft seal in a hermetically leak-tight tank. In FIG. 1, FIG. 2 and FIG. 4, the drive takes place via drive motors located directly in the storage tank. There, the connection from the exterior to the compressor inside the tank consists solely of an electricity supply and control cable. Examples of compressors suitable for this include fully hermetic scroll compressors.

Storage tank 2 has a thermally insulated construction. The heat transfer medium 13 has a reagent partner, a binding agent and a chemical complexing agent to absorb, reduce or convert the working substance used in the heat pump 3.

The first heat exchanger 9 is hydraulically connected to a first external heat exchanger 38. The first external heat exchanger 38 is able to deliver useful cooling to the vehicle's interior. The second heat exchanger 10 is hydraulically connected to a second external heat exchanger 39, whereby the second external heat exchanger is designed to deliver heat intermittently to the vehicle's interior. The second heat exchanger 10 is additionally hydraulically connected to a third external heat exchanger 40. The third external heat exchanger 40 is used as a dry cooler. The second external heat exchanger 39 and the third external heat exchanger 40 are connected via a changeover valve 41. Depending on the position of the changeover valve 41, the second external heat exchanger 39 can be used to heat the interior while the first heat exchanger 38 uses its cold surface to dehumidify the air of the vehicle's interior. In summer operation, only the third heat exchanger 40 is used as a dry cooler.

FIG. 5 shows the flexible opportunities for using the device that arise by using a heat transfer medium instead of a possibly toxic working substance in the external heat exchangers the evaporator.

Figure 6:
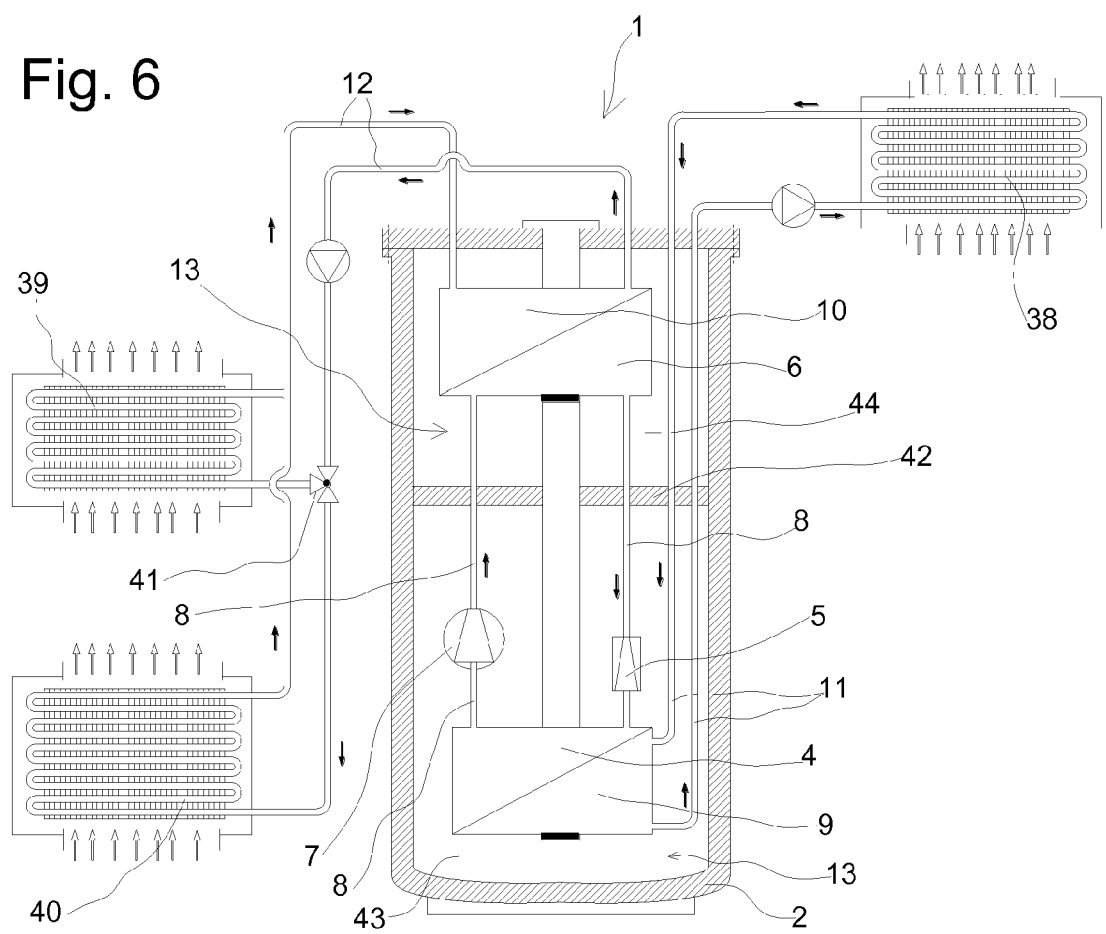
FIG. 6: A diagrammatic representation of a heating and cooling supply device with a storage tank divided into two regions.

FIG. 6 shows a diagrammatic representation of a heating and cooling supply device 1 for a vehicle with a storage tank 2. The storage tank 2 has two storage compartments 43 and 44 hydraulically separated from one another by a separation device 42. Subdivision of the storage tank into several storage compartments 43 and 44 enables a temperature distribution of the heat transfer medium 13 inside the storage compartments 43 and 44 to be adjusted to particular intended uses. It is also possible to use different heat transfer media in the storage compartments 43 and 44, whereby the heat transfer media can be adapted to the respective intended use. It is also possible, and is provided for according to an aspect of the invention, to subdivide the storage tank 2 into three or more storage compartments. Subdivision into different compartments within a single storage tank prevents the temperature equalization that is driven by the temperature-dependent density of the respective heat transfer medium and thus by gravity. A temperature differential between an evaporator and condenser situated in different compartments is more easily achievable by means of individual compartments within the storage tank. This is true particularly in mobile use. The function of the heat transfer medium as a reaction partner for working substance escaping in the event of damage is retained in spite of the subdivision into different compartments.

The invention claimed is:

1. Heating and cooling supply device with a heat transfer medium arranged in the interior space of a storage tank, whereby inside the storage tank there is additionally arranged a cycle process plant of any kind that is operated with a working substance in its circulation, whereby the heat transfer medium in a lower region of the interior space mostly has a lower temperature than in a region of the interior space arranged above it, whereby all the components of the cycle process plant that contain the working substance are arranged in the interior space of the storage tank, wherein the storage tank is adapted to the working substance in such a way that the working substance escaping from the cycle process plant in the event of damage to the components carrying the working substance remains securely inside the storage tank, wherein the heat transfer medium has constituents to bind or convert the working substance.

2. Heating and cooling supply device according to claim 1, wherein the pressure resistance of the storage tank is adapted to the working substance being used.

3. Heating and cooling supply device according to claim 1, wherein a filling level of a filling of the storage tank with the heat transfer medium is adapted to the working substance.

4. Heating and cooling supply device according to claim 1 wherein the components of the cycle process plant arranged in the interior space are partly or entirely surrounded by the heat transfer medium.

5. Heating and cooling supply device according to claim 1, wherein the heat transfer medium has a quantity of the constituents that is sufficient to react with and bind the working substance escaping from the cycle process plants in the event of a damaging incident.

6. Heating and cooling supply device according to claim 1, wherein the proportion of the heat transfer medium as a reaction partner of the respective working substance is dimensioned in such a way that the working substance contained in the cycle process plants can be completely bound or converted by the constituent.

7. Heating and cooling supply device according to claim 1, wherein the working substance is ammonia or carbon dioxide or a pure hydrocarbon.

8. Heating and cooling supply device according to claim 1, wherein the heat transfer medium consists at least partly of at least one latent heat storage material.

9. Heating and cooling supply device according to claim 1, wherein the heat transfer medium is present in a liquid or a solid phase.

10. Heating and cooling supply device according to claim 1, wherein the heat transfer medium is a mixture of water, glycol and paraffin.

11. Heating and cooling supply device according to claim 1, wherein there is added to the heat transfer medium a constituent that induces a material conversion with the respective working substance.

12. Heating and cooling supply device according to claim 1, wherein proportion of the heat transfer medium additionally or exclusively contains another latent storage material that does not undergo any phase change during the correct operation of the storage tank with the cycle process plant, whereby this latent storage material does not undergo a phase change and energy absorption and prevents overheating of the storage tank until additional heat arises due to the input of heat or as a result of exothermic reactions between the working substance and reactive substances from the heat transfer medium.

13. Heating and cooling supply device according to claim 1, wherein at least two cycle process plants are arranged in the storage tank.

14. Heating and cooling supply device according to claim 1, wherein the storage tank can be used as a heat accumulator and heat distributor independently of the operation of the cycle process plants.

15. Heating and cooling supply device according to claim 1, wherein the storage tank has, storage compartments and at least one separator device, whereby the separator device causes an extensive or complete thermal and material separation between the storage compartments of the storage tank.

16. Heating and cooling supply device according to claim 1, wherein pipes and components of the cycle process plant are arranged and specifically designed in various vertical positions of different storage tank temperatures that come into being due to intentional influencing of the temperature of the working medium of the cycle process plant by the heat transfer medium and do not take place according to flow-related or practical reasons, so that the arrangement and design lead to temperature changes in the working medium that result in heating or cooling or sub-cooling of the working medium and thereby influence the cycle process plant and its efficiency, and furthermore thermal effects of one cycle process plant on another independent cycle process plant depend in the same way on the targeted arrangement of individual components and pipework and the pipework layout within the storage tank and relative to one another in such a way that efficiency-increasing operating conditions depending on the supply of heat and output of heat into/out of the storage tank are determined by the parallel or sequential operation of the cycle process plants.

17. Heating and cooling supply device according to claim 1, wherein pipes and components of the cycle process plant are arranged and specifically designed in various vertical positions of different storage tank temperatures in order to enable the operationally dependent waste heat of individual components such as that from a compressor to be released to the heat transfer medium surrounding the latter.

18. Heating and cooling supply device according to claim 1, wherein a change of function by means of a changeover switch device between external heat exchangers via which heat is transported into the storage tank or out of the storage tank leads to a situation in which one and the same heat exchanger alternately performs a cooling or heating function.

19. Heating and cooling supply device according to claim 1, wherein the installation of heat pipes together with refrigeration cycle processes, as variants of cycle process plants, inside the storage tank brings about a controlling function due to beat transport in the heat transfer medium, whereby the heat transport via a heat pipe can take place in the opposite direction to the temperatures increasing in air upwards direction as a result of temperature-dependent density differences.

* * * * *